US012638089B2

(12) United States Patent
Bryant et al.

(10) Patent No.: US 12,638,089 B2
(45) Date of Patent: May 26, 2026

(54) AXIAL THREE-WAY MODULATING VALVE

(71) Applicant: Mueller Refrigeration, LLC, Hartsville, TN (US)

(72) Inventors: Ralph S. Bryant, Clarksville, TN (US); Gregory S. Wade, Portland, TN (US); Bradley W. Randolph, Mt. Juliet, TN (US); Mark Bornand, Gallatin, TN (US); Tyler A. Meador, Lafayette, TN (US)

(73) Assignee: MUELLER REFRIGERATION, LLC, Hartsville, TN (US)

(*) Notice: Subject to any disclaimer, the term of this patent is extended or adjusted under 35 U.S.C. 154(b) by 288 days.

(21) Appl. No.: 18/212,503

(22) Filed: Jun. 21, 2023

(65) Prior Publication Data

US 2023/0407976 A1  Dec. 21, 2023

Related U.S. Application Data

(63) Continuation of application No. 17/527,563, filed on Nov. 16, 2021, now Pat. No. 11,719,349.

(51) Int. Cl.
*F16K 11/07* (2006.01)
*F16K 27/04* (2006.01)
(Continued)

(52) U.S. Cl.
CPC ...... *F16K 11/0716* (2013.01); *F16K 11/0712* (2013.01); *F16K 27/041* (2013.01);
(Continued)

(58) Field of Classification Search
CPC ................. F16J 15/3208; F25B 31/006; F25B 2400/0403; F25B 2600/2501;
(Continued)

(56) References Cited

U.S. PATENT DOCUMENTS 3,081,842 A * 3/1963 Kershner ................ F16D 55/40
                                                                188/71.6
3,122,124 A   2/1964 Yocum
(Continued)

FOREIGN PATENT DOCUMENTS

CA      2 764 364 A1   12/2010
CN      203477479 U    3/2014
(Continued)

*Primary Examiner* — Craig M Schneider
*Assistant Examiner* — Christopher D Ballman
(74) *Attorney, Agent, or Firm* — Eckert Seamans Cherin & Mellott, LLC

(57) ABSTRACT

A valve assembly includes a valve body defining a cylindrical passage therein about an axis. An inlet port is defined in or near a first end of the valve body. First and second outlet ports are defined in the valve body extending radially outward from the cylindrical passage. A cylindrical valve spool having a central passage is positioned within, and sealingly engaged with, the cylindrical passage. The valve spool is moveable along the axis among: a first position wherein the inlet port is in fluid communication with the first outlet port but not the second outlet port, a second position wherein the inlet port is in fluid communication with the second outlet port but not the first outlet port, and an intermediate position between the first and second positions wherein the inlet port is in fluid communication with both of the first and second outlet ports.

17 Claims, 11 Drawing Sheets

(51) Int. Cl.

| | |
|---|---|
| *F25B 6/04* | (2006.01) |
| *F25B 41/31* | (2021.01) |
| *F25B 41/32* | (2021.01) |
| *F25B 41/35* | (2021.01) |
| *F16J 9/00* | (2006.01) |
| *F16J 9/06* | (2006.01) |
| *F25B 31/00* | (2006.01) |
| *F25B 41/20* | (2021.01) |

(52) U.S. Cl.
CPC ................ *F25B 6/04* (2013.01); *F25B 41/31* (2021.01); *F25B 41/32* (2021.01); *F25B 41/35* (2021.01); *F16J 9/00* (2013.01); *F16J 9/064* (2013.01); *F25B 31/006* (2013.01); *F25B 41/20* (2021.01); *F25B 2341/06* (2013.01); *F25B 2400/0403* (2013.01); *F25B 2600/2501* (2013.01); *F25B 2600/2507* (2013.01)

(58) Field of Classification Search
CPC .... F25B 2600/2507; F25B 6/04; F25B 41/20; F16K 11/0712
See application file for complete search history.

(56) References Cited

U.S. PATENT DOCUMENTS

| | | | | |
|---|---|---|---|---|
| 3,339,574 | A | * | 9/1967 | Erb .......................... F02C 7/232 |
| | | | | 137/107 |
| 3,589,401 | A | | 6/1971 | Harding |
| 3,794,075 | A | | 2/1974 | Stoll et al. |
| 3,952,535 | A | | 4/1976 | Putman |
| 3,987,810 | A | * | 10/1976 | Bjorklund ............... F16K 23/00 |
| | | | | 137/107 |
| 4,658,859 | A | | 4/1987 | Backe et al. |
| 4,699,171 | A | * | 10/1987 | Sugden ............... F16K 17/0473 |
| | | | | 137/506 |
| 4,774,976 | A | * | 10/1988 | Janecke ............. G05D 16/2024 |
| | | | | 251/129.08 |
| 4,887,643 | A | | 12/1989 | Tomlin et al. |
| 4,982,760 | A | | 1/1991 | Mustaklem |
| 5,755,446 | A | * | 5/1998 | Dean .................... F16J 15/3208 |
| | | | | 277/358 |
| 5,778,918 | A | | 7/1998 | McLelland |
| 5,890,370 | A | | 4/1999 | Sakakibara |

| | | | | |
|---|---|---|---|---|
| 6,375,086 | B1 | | 4/2002 | Babin et al. |
| 6,446,682 | B1 | | 9/2002 | Viken |
| 6,612,335 | B1 | | 9/2003 | Assa et al. |
| 7,322,373 | B2 | * | 1/2008 | Lewis ..................... F02C 9/263 |
| | | | | 137/538 |
| 7,921,877 | B2 | | 4/2011 | Murgai |
| 8,091,860 | B2 | | 1/2012 | Thompson et al. |
| 8,282,020 | B2 | | 10/2012 | Kiss et al. |
| 8,393,344 | B2 | | 3/2013 | Hunnicutt |
| 8,397,757 | B2 | | 3/2013 | Kannoo et al. |
| 8,840,118 | B1 | | 9/2014 | Giovanardi et al. |
| 9,422,783 | B2 | * | 8/2016 | Gustafson ............. E21B 33/064 |
| 9,435,443 | B2 | | 9/2016 | Passagot |
| 9,732,864 | B2 | * | 8/2017 | Marocchini ........... F16K 27/041 |
| 9,903,180 | B2 | * | 2/2018 | Boutin .................... E21B 34/12 |
| 10,088,849 | B2 | * | 10/2018 | Hurst .................... G05D 7/0641 |
| 10,119,626 | B2 | | 11/2018 | Greiner et al. |
| 10,145,594 | B2 | | 12/2018 | Fuller et al. |
| 10,215,304 | B2 | | 2/2019 | Van de Ven et al. |
| 10,309,544 | B2 | * | 6/2019 | Matteucci ........... F16K 11/0716 |
| 10,619,899 | B2 | | 4/2020 | Willers et al. |
| 11,209,096 | B2 | * | 12/2021 | Patterson .............. F16K 11/044 |
| 11,353,124 | B2 | * | 6/2022 | Weir .................. F16K 31/1226 |
| 2010/0078085 | A1 | * | 4/2010 | Kurokawa .......... F16K 17/0473 |
| | | | | 137/528 |
| 2011/0079286 | A1 | | 4/2011 | Marocchini |
| 2013/0146303 | A1 | * | 6/2013 | Gustafson ............. E21B 33/064 |
| | | | | 166/364 |
| 2013/0153068 | A1 | | 6/2013 | West et al. |
| 2014/0061516 | A1 | | 3/2014 | Gustafson et al. |
| 2014/0103238 | A1 | | 4/2014 | Lv et al. |
| 2014/0326459 | A1 | | 11/2014 | Landrith, II et al. |
| 2016/0131270 | A1 | * | 5/2016 | Berner ................ F16K 11/0712 |
| | | | | 137/625.48 |
| 2016/0208955 | A1 | | 7/2016 | Pinto, IV et al. |
| 2017/0037984 | A1 | | 2/2017 | Frippiat et al. |
| 2017/0167308 | A1 | | 6/2017 | Kopp et al. |
| 2017/0175916 | A1 | | 6/2017 | Huynh et al. |
| 2017/0205126 | A1 | | 7/2017 | Jin |
| 2018/0299913 | A1 | | 10/2018 | Sheppard et al. |
| 2020/0200271 | A1 | | 6/2020 | Li |

FOREIGN PATENT DOCUMENTS

| | | |
|---|---|---|
| CN | 108167501 A | 6/2018 |
| DE | 102009048787 A1 | 4/2011 |
| EP | 2516907 A1 | 10/2012 |

* cited by examiner

AXIAL THREE-WAY MODULATING VALVE

CROSS REFERENCE TO RELATED APPLICATIONS

This application is a continuation of and claims priority to U.S. patent application Ser. No. 17/527,563 filed Nov. 16, 2021, entitled, AXIAL THREE-WAY MODULATING VALVE.

FIELD OF THE INVENTION

The disclosed concept relates generally to a flow control device, and more particularly to a valve for controlling the flow of fluid in a system. The disclosed concept further relates to a system including a valve for controlling the fluid in the system.

BACKGROUND OF THE INVENTION

Flow control devices, such as motor controlled electric valves, may be provided in heating/cooling systems to control the flow of fluid through the system. For example, motor controlled valves may be used at nodes of diverging loops of circuits to provide refrigerant for heat reclaim or for defrosting evaporators. The motor controlled valves may include a piston which is movable by an electric motor to vary the flow of fluid through the valve. The motor may be rotated by a signal sent by a controller. The motor may rotate a gear train or other arrangement that is coupled to the piston to cause the piston to move.

SUMMARY OF THE INVENTION

These needs, and others, are met by embodiments of the disclosed concept. In a first example embodiment, a valve assembly is provided. The valve assembly comprises: a valve body defining a cylindrical passage therein disposed about a longitudinal axis of the valve body; an inlet port defined in or near a first end of the valve body; a first outlet port defined in the valve body, the first outlet port extending radially with respect to the longitudinal axis outward from the cylindrical passage; a second outlet port defined in the valve body, the second outlet port extending radially with respect to the longitudinal axis outward from the cylindrical passage; and a cylindrical valve spool positioned within, and sealingly engaged with, the cylindrical passage, the valve spool defining a central passage therethrough, wherein the valve spool is moveable along the longitudinal axis among: a first position wherein the inlet port is in fluid communication with the first outlet port but not the second outlet port, a second position wherein the inlet port is in fluid communication with the second outlet port but not the first outlet port, and an intermediate position between the first position and the second position wherein the inlet port is in fluid communication with both of the first outlet port and the second outlet port.

The inlet port may be defined in the first end of the valve body and extend axially along the longitudinal axis outward from the cylindrical passage.

The valve assembly may further comprise a linear drive coupled to the valve spool, wherein the linear drive is structured to selectively position the valve spool among the first position, the second position, and the intermediate position.

The linear drive may comprise an axial drive stepper motor.

The valve spool may comprise a dowel pin extending across the central passage, and the linear drive may be coupled to the valve spool via the dowel pin.

The valve spool may be sealingly engaged with the cylindrical passage via a number of seal arrangements positioned between the valve spool and the valve body.

The valve assembly may further comprise a number of circumferential grooves defined in the valve body opening into the cylindrical passage, and each seal arrangement of the number of seal arrangements may comprise: an o-ring positioned in a corresponding circumferential groove of the number of circumferential grooves, and a seal ring positioned radially inward from the o-ring. Each seal ring may have a rectangular cross-section. Each seal ring may be made from PTFE.

The first outlet port may be closer to the inlet port than the second outlet port.

The first outlet port and the second outlet port may be clocked 180 degrees apart with respect to the longitudinal axis.

The valve body may comprise an end cap selectively coupled to the remainder of the valve body and the inlet port may be defined in the end cap.

The end cap may be selectively coupled to the remainder of the valve body via a threaded connection.

The valve body may be formed from a brass material and the valve spool may be formed from a stainless steel material.

The valve assembly may further comprise a sight glass selectively coupled to a port formed in the valve body.

In another example embodiment, a refrigeration system is provided that comprises a valve assembly such as previously described.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF THE INVENTION

Figure 1:
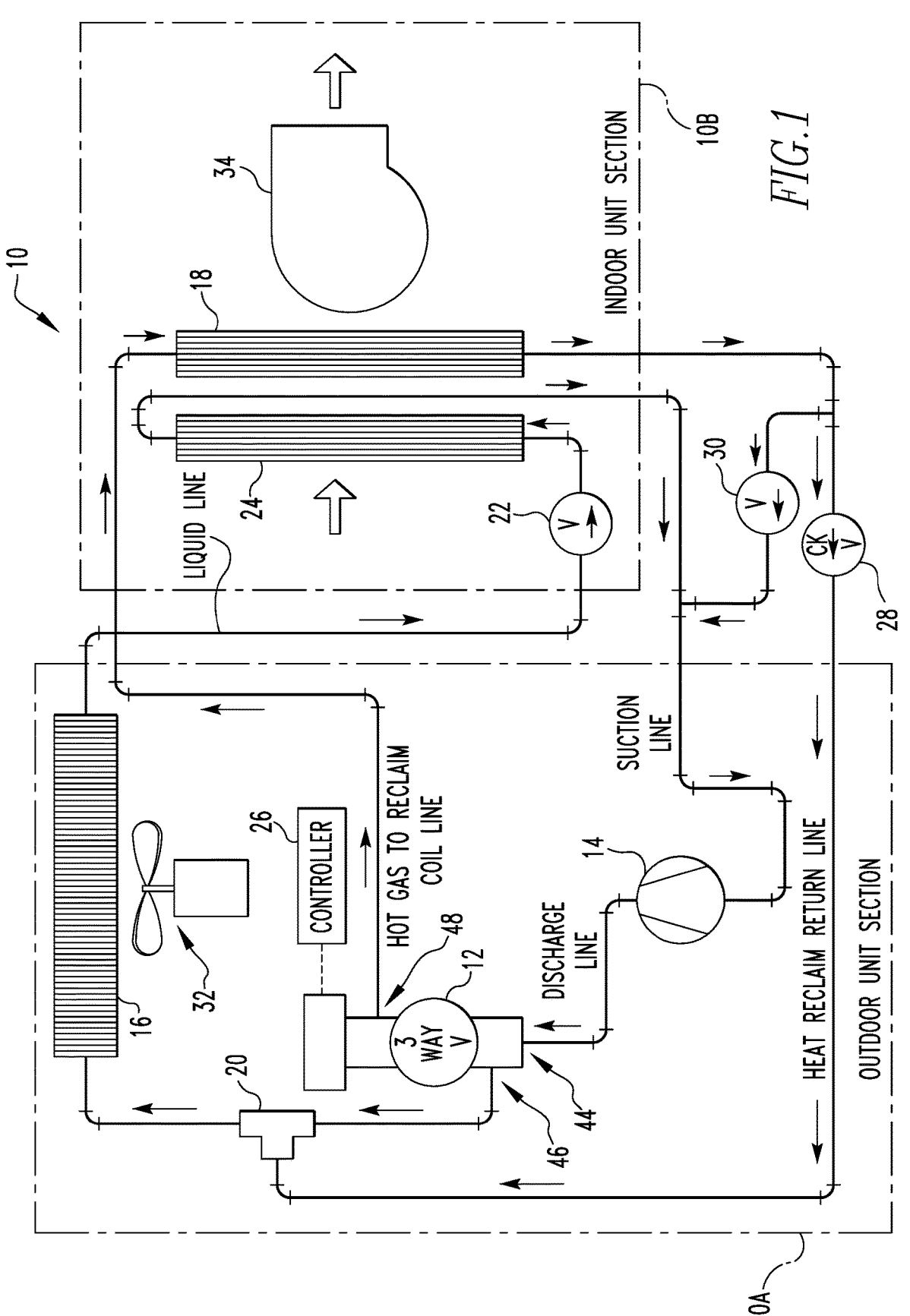
FIG. 1 is an exemplary heat reclaim system having a valve assembly in accordance with one example embodiment of the disclosed concept.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are coupled directly in contact with each other (i.e., touching). As used herein, "fixedly coupled" or "fixed" means that two components are coupled so as to move as one while maintaining a constant orientation relative to each other.

As employed herein, the statement that two or more parts or components "engage" one another shall mean that the parts exert a force against one another either directly or through one or more intermediate parts or components. As employed herein, the term "number" shall mean one or an integer greater than one (i.e., a plurality). Directional phrases used herein, such as, for example and without limitation, left, right, upper, lower, front, back, on top of, and derivatives thereof, relate to the orientation of the elements shown in the drawings and are not limiting upon the claims unless expressly recited therein.

The principles of the disclosed concept have particular application to three-way valves for refrigeration and air conditioning systems and thus will be described below chiefly in this context. It will of course be appreciated, and also understood, that the principles of the disclosed concept may be useful in other fluid transfer applications where it is desirable to direct fluid to multiple outlets of a valve.

Referring first to FIG. 1, an exemplary heat reclaim system 10 including a valve assembly 12 in accordance with one example embodiment of the disclosed concept is generally shown. System 10 may be generally be broken down into an outdoor unit section 10A and an indoor unit section 10B. System 10 further includes a compressor 14, a condenser 16, a heat reclaim coil 18, a tee 20, an expansion valve 22, an evaporator coil 24, and a controller 26. System 10 may optionally include a check valve 28 for preventing fluid flow from condenser 16 to the heat reclaim coil 18. System 10 may also optionally include a purge valve 30 provided between a heat reclaim return line from heat reclaim coil 18 and the suction line of compressor 14.

The fluid flowing (as shown by the arrows in FIG. 1) through system 10, which may be a suitable refrigerant, such as a two-phase refrigerant, enters compressor 14 and is compressed. The compressed fluid then flows to valve assembly 12, which may deliver the fluid to one or both of condenser 16, via tee 20, and/or heat reclaim coil 18. Fluid delivered to condenser 16 is cooled and the heat rejected. The heat rejected from heat condenser 16, is dissipated (e.g., assisted via an outdoor fan 32) and then the fluid flows to expansion valve 22 that expands the fluid to a low pressure liquid-vapor. The fluid then flows to evaporator coil 24 where heat is absorbed by the fluid. The fluid delivered to heat reclaim coil 18 is cooled by rejecting heat to the air stream derived from evaporator coil 24 (e.g., assisted via an indoor fan 34). The fluid exits heat reclaim coil 18 and passes to condenser 16 via tee 20 (optionally via check valve 28), and/or optionally to the suction side of compressor 14 via purge valve 30. Controller 26 may be provided to control valve assembly 12, and specifically an actuator (discussed below) of valve assembly 12 to control the flow of fluid exiting valve assembly 12.

Figure 3:
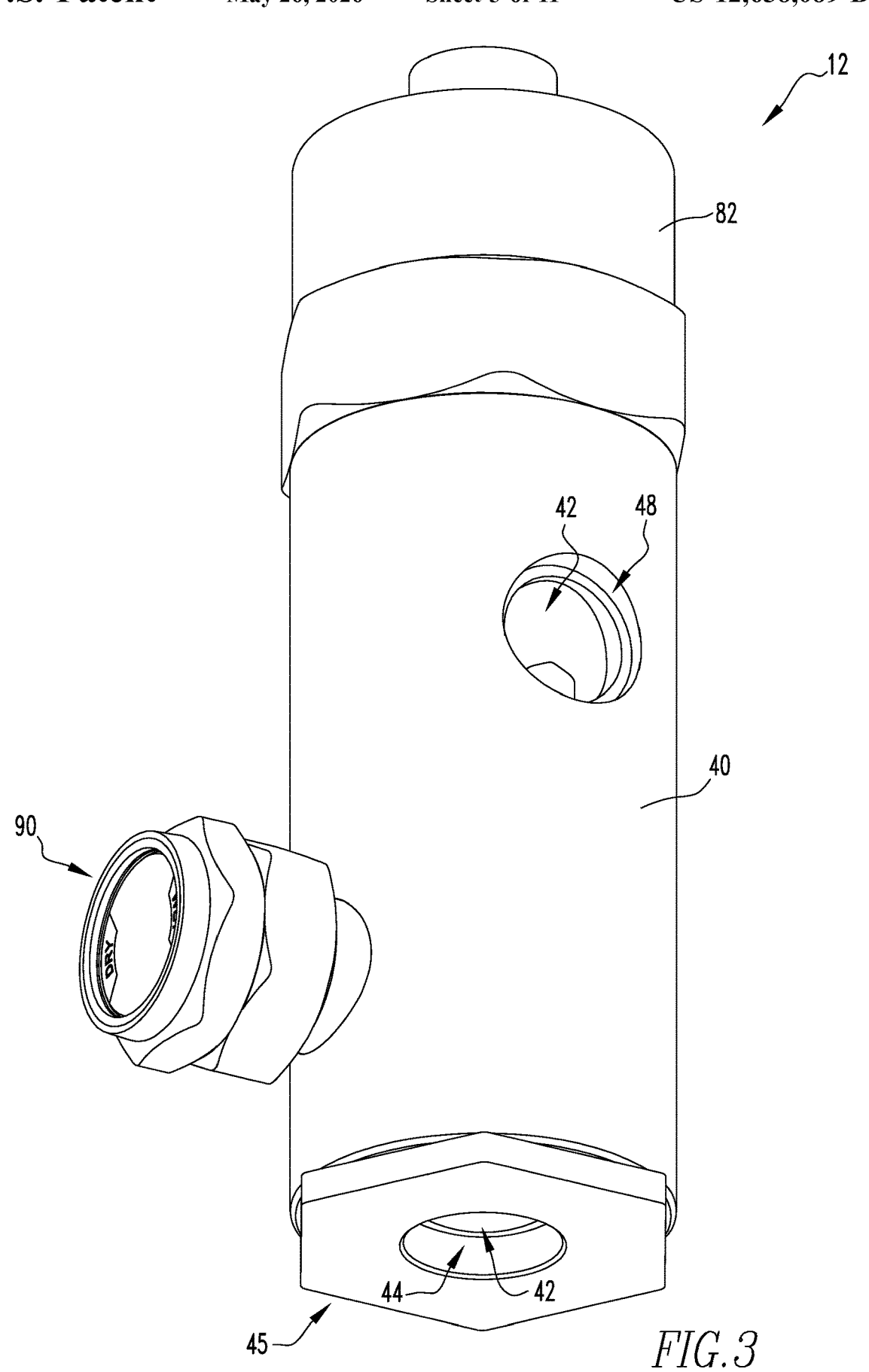
FIG. 3 is another perspective view of the valve assembly of FIG. 2 showing a bottom portion of the valve assembly having an inlet port defined therein and a second outlet port defined in the side of the valve assembly.
Figure 4:
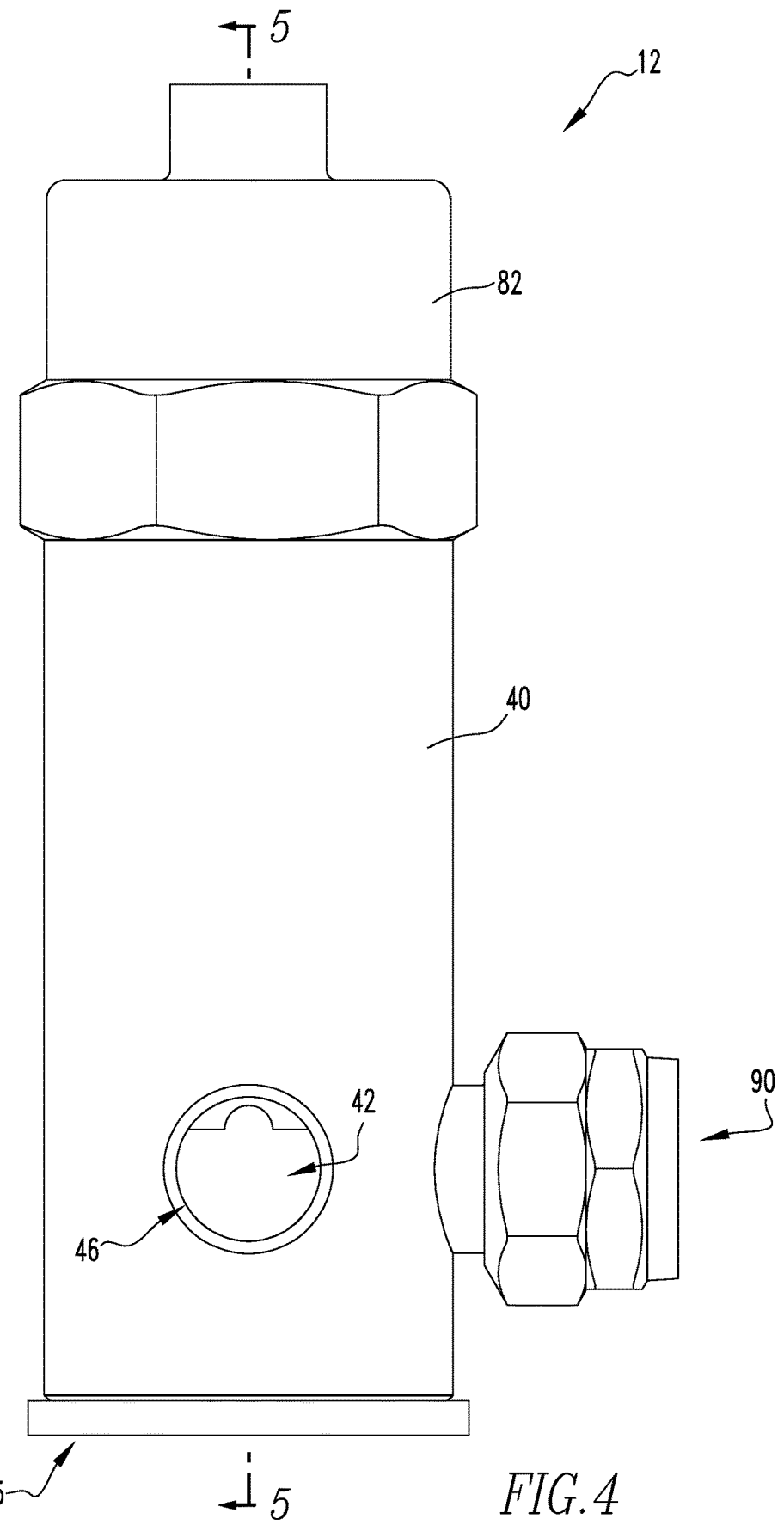
FIG. 4 is an elevation view of the valve assembly of FIGS. 2 and 3 showing the first outlet port.
Figure 5:
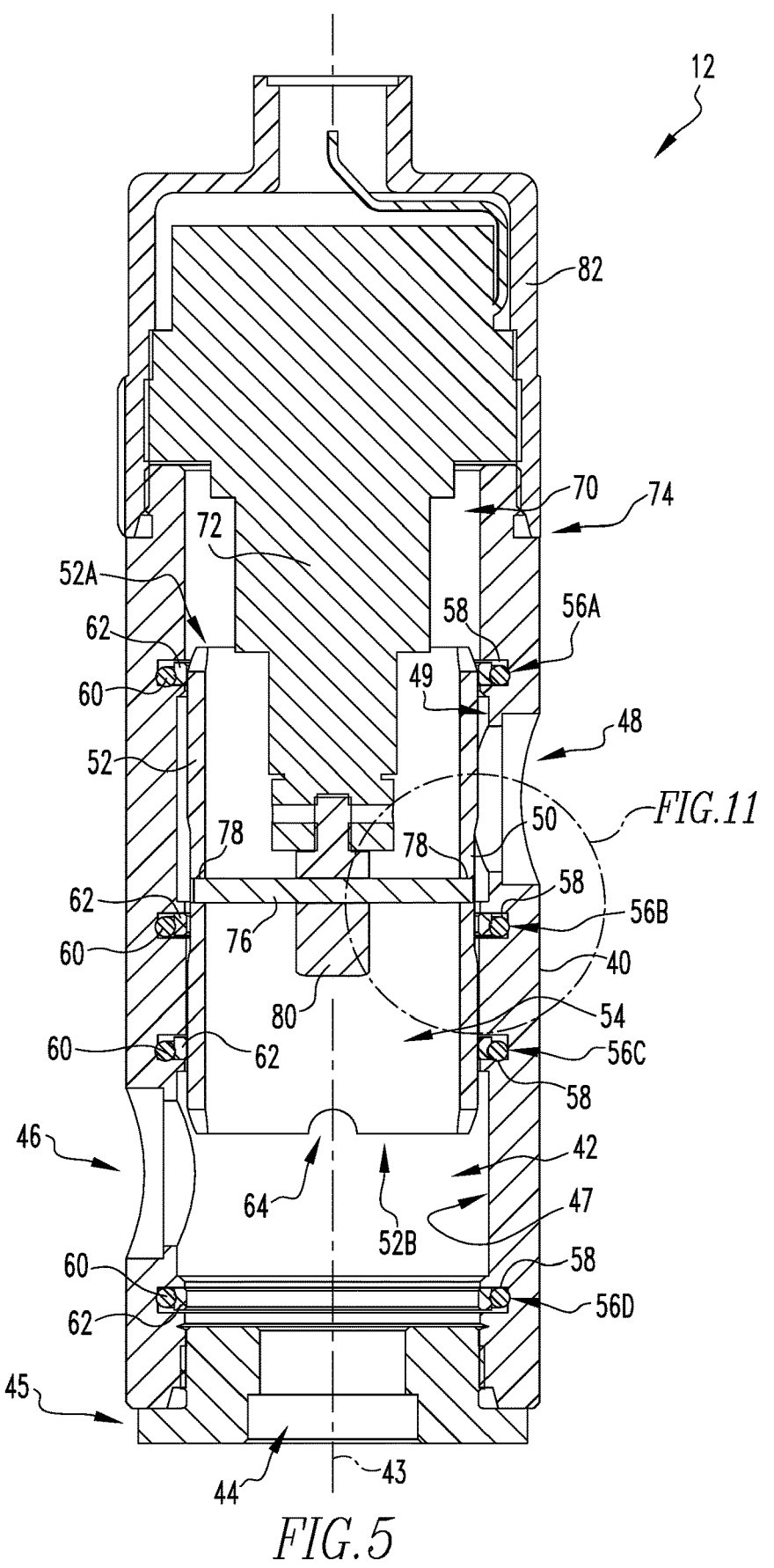
FIG. 5 is a partially schematic, first sectional view of the valve assembly of FIGS. 2-4 taken along line 5-5 of FIG. 4 showing a valve spool thereof positioned in a first position.
Figures 6, 12:
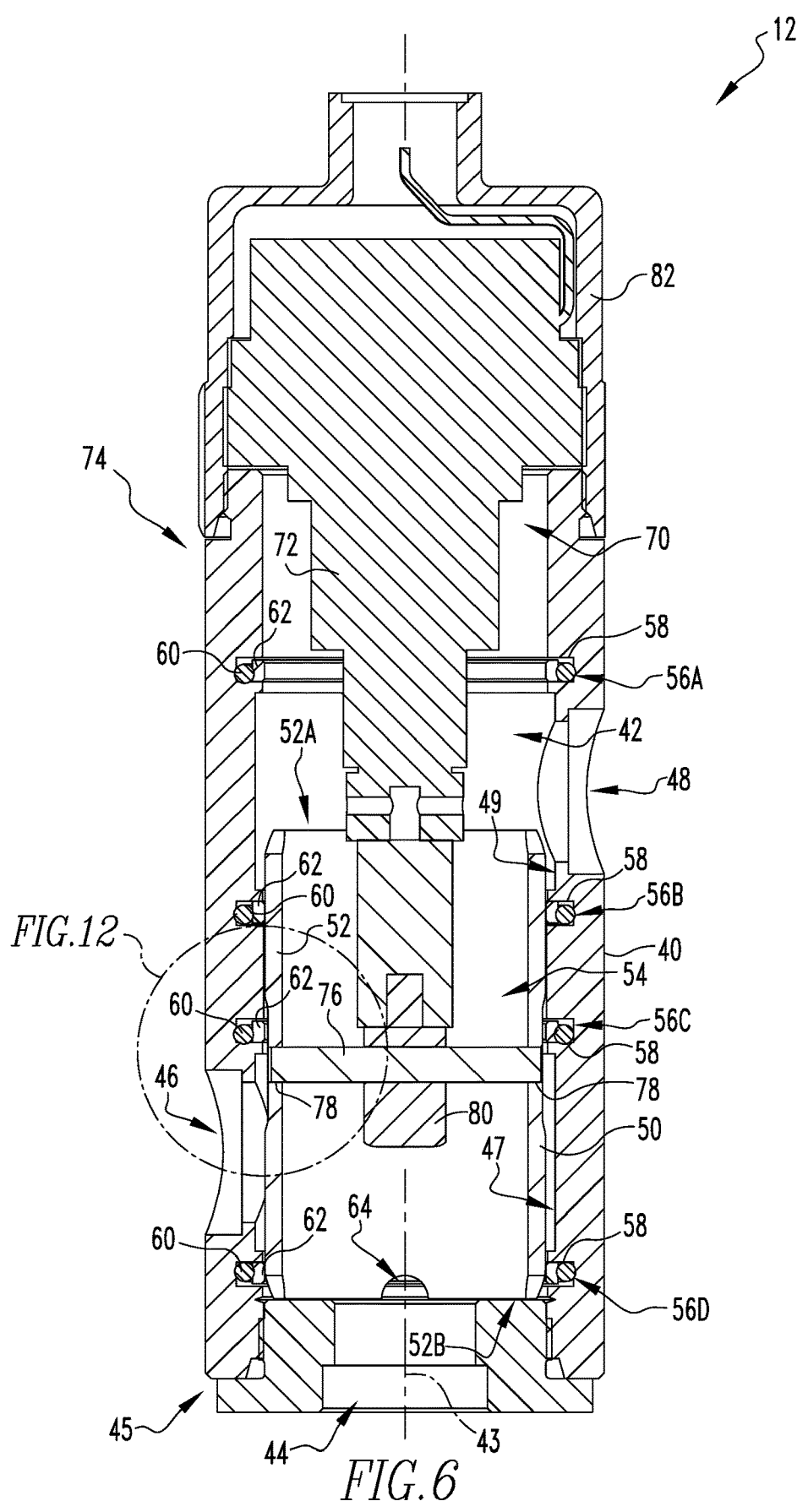
FIG. 6 is a partially schematic, second sectional view of the valve assembly of FIGS. 2-4 taken along line 5-5 of FIG. 4 showing the valve spool thereof positioned in a second position.
FIG. 12 is a detail view of a portion of the arrangement of FIG. 6 as indicated therein.
Figure 7:
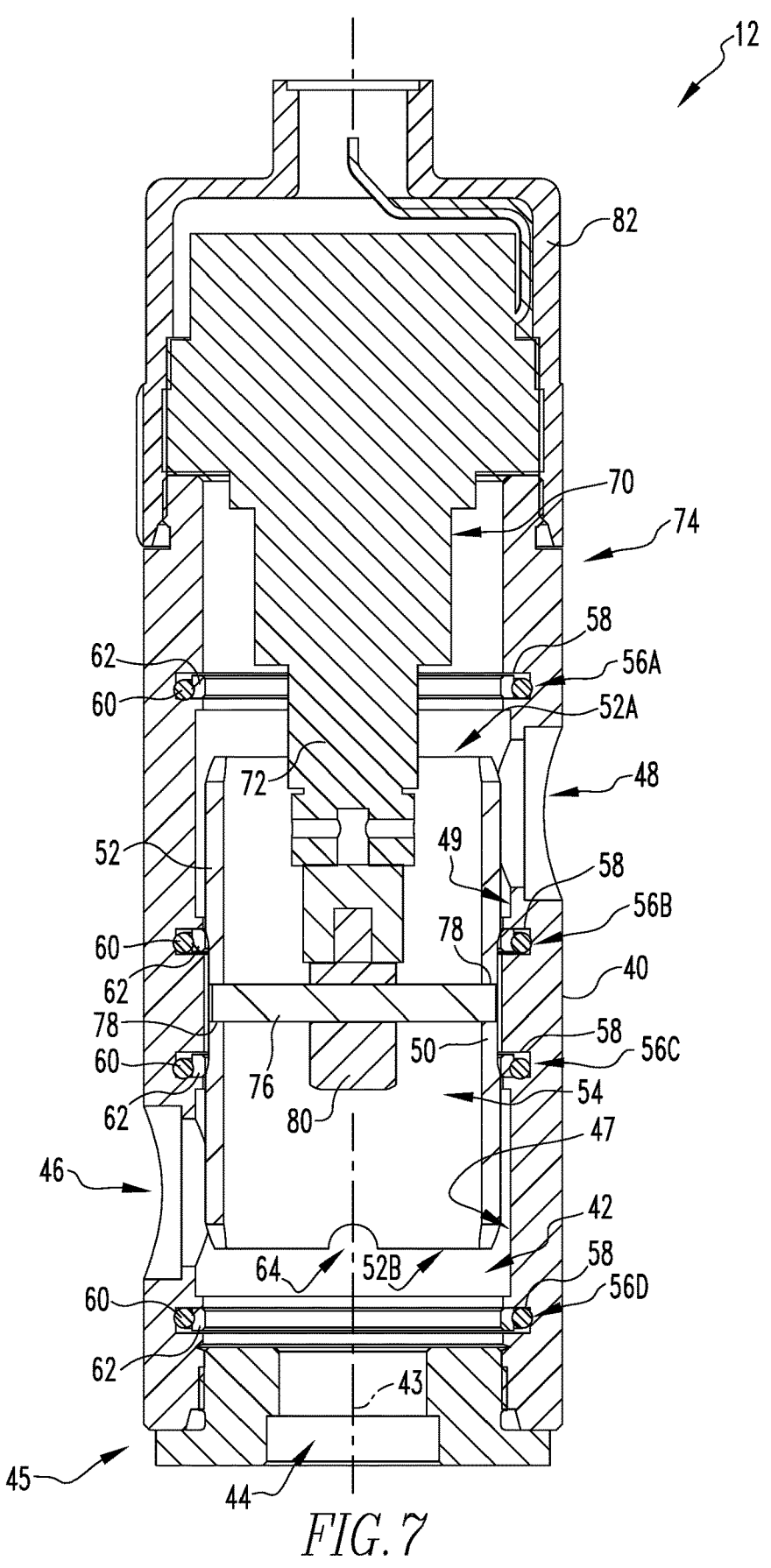
FIG. 7 is a partially schematic, third sectional view of the valve assembly of FIGS. 2-4 taken along line 5-5 of FIG. 4 showing the valve spool thereof positioned in a third position between the first position of FIG. 5 and the second position of FIG. 6.
Figure 8:
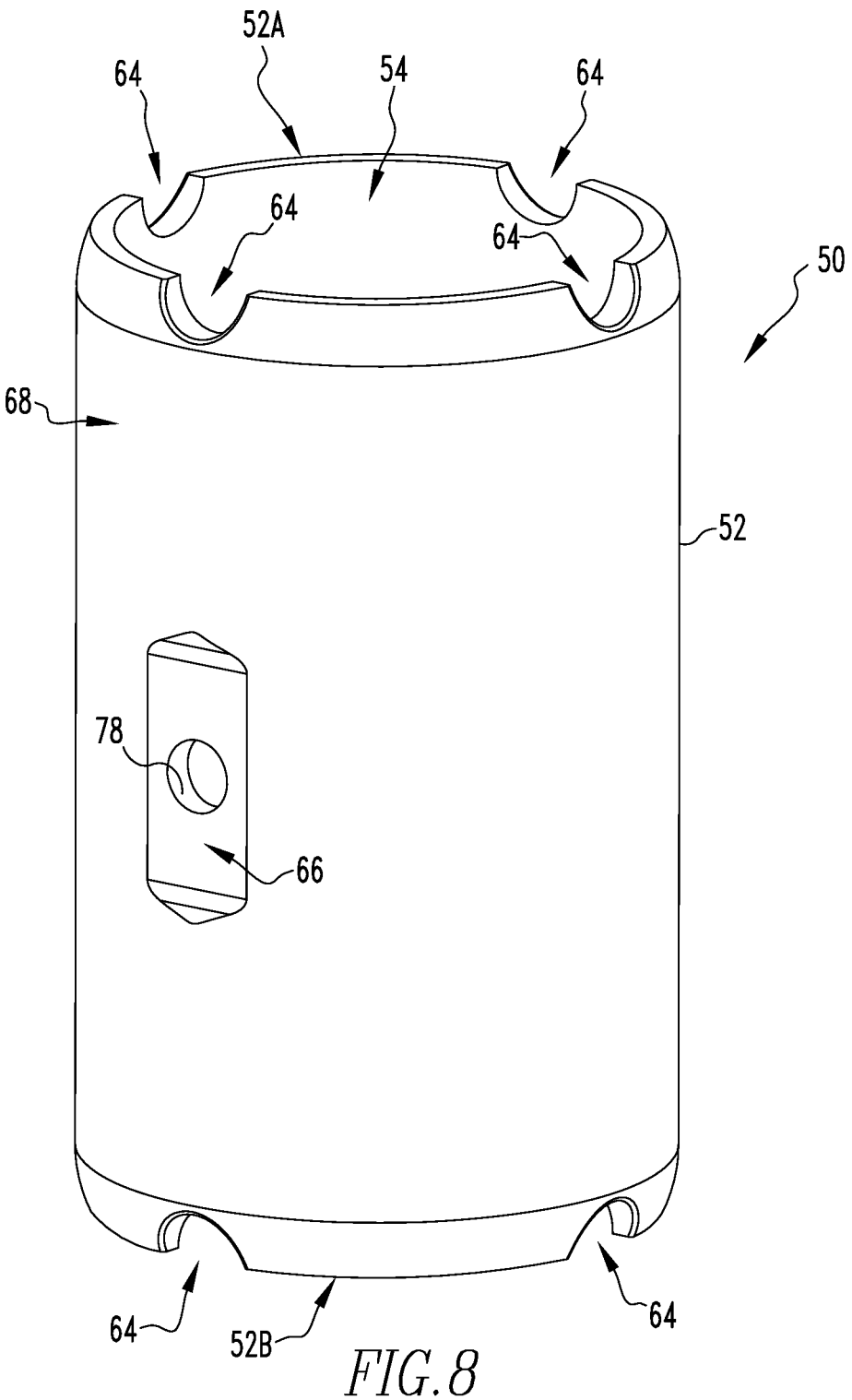
FIG. 8 is a perspective view of the valve spool of FIGS. 5-7.
Figure 9:
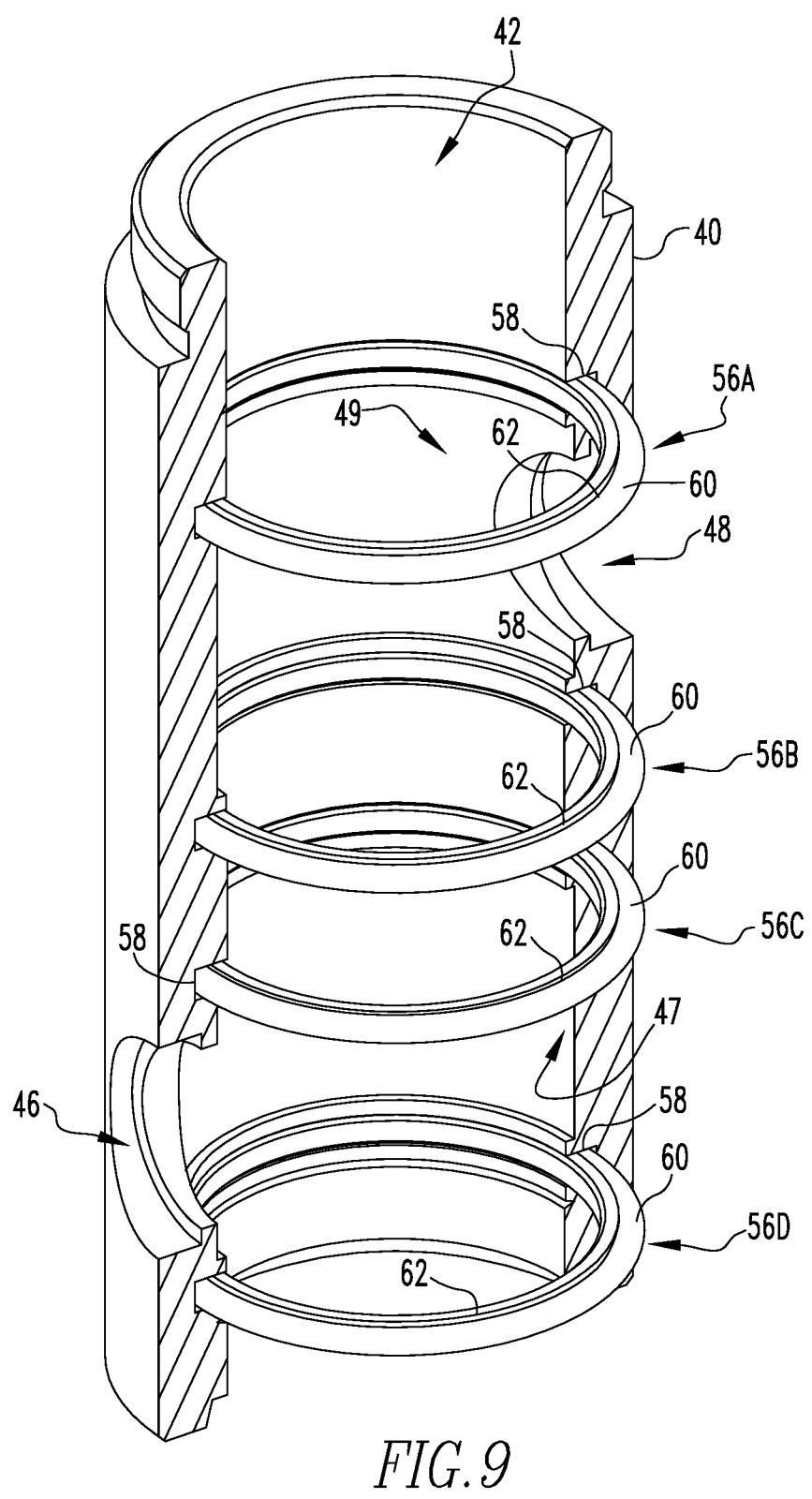
FIG. 9 is a perspective view of a portion of the valve body of the valve assembly of FIGS. 2-7 shown with sealing arrangements of the valve assembly.
Figure 10:
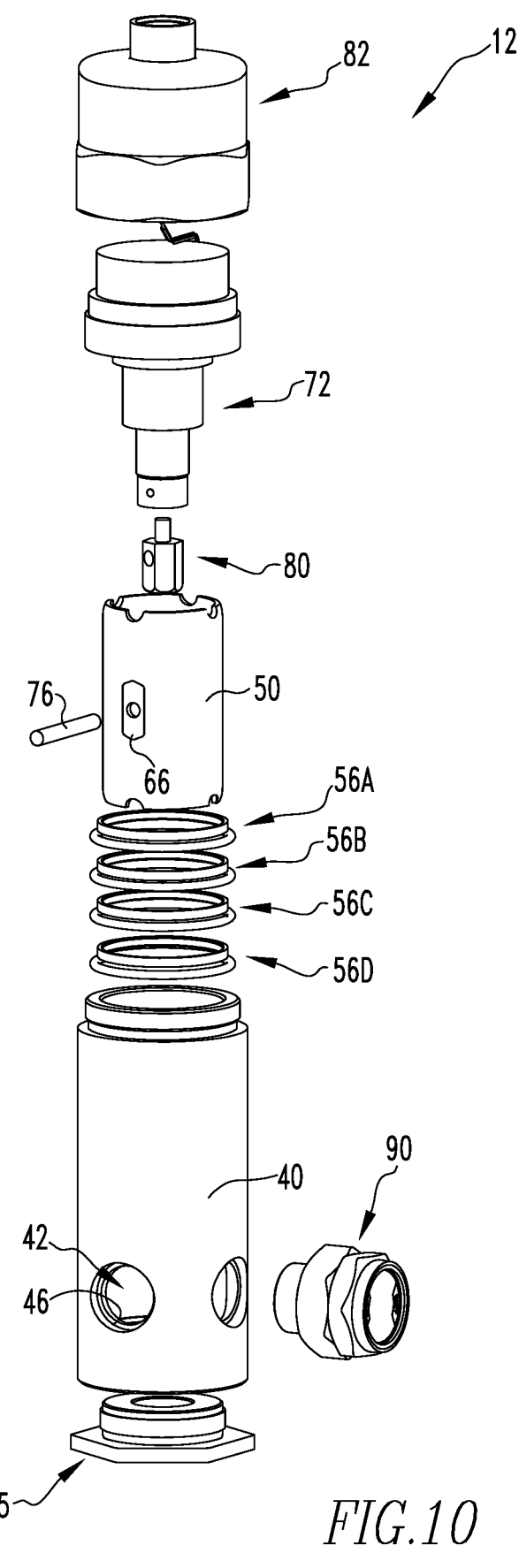
FIG. 10 is an exploded view of the valve assembly of FIGS. 2-7.
Figure 11:
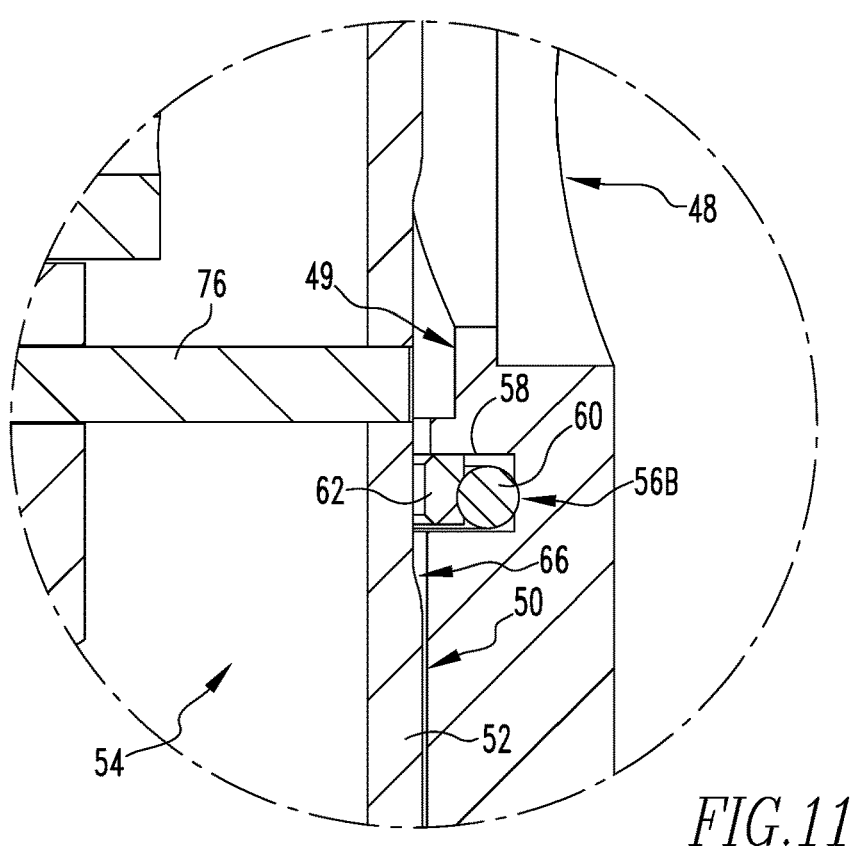
FIG. 11 is a detail view of a portion of the arrangement of FIG. 5 as indicated therein.
Figure 12:
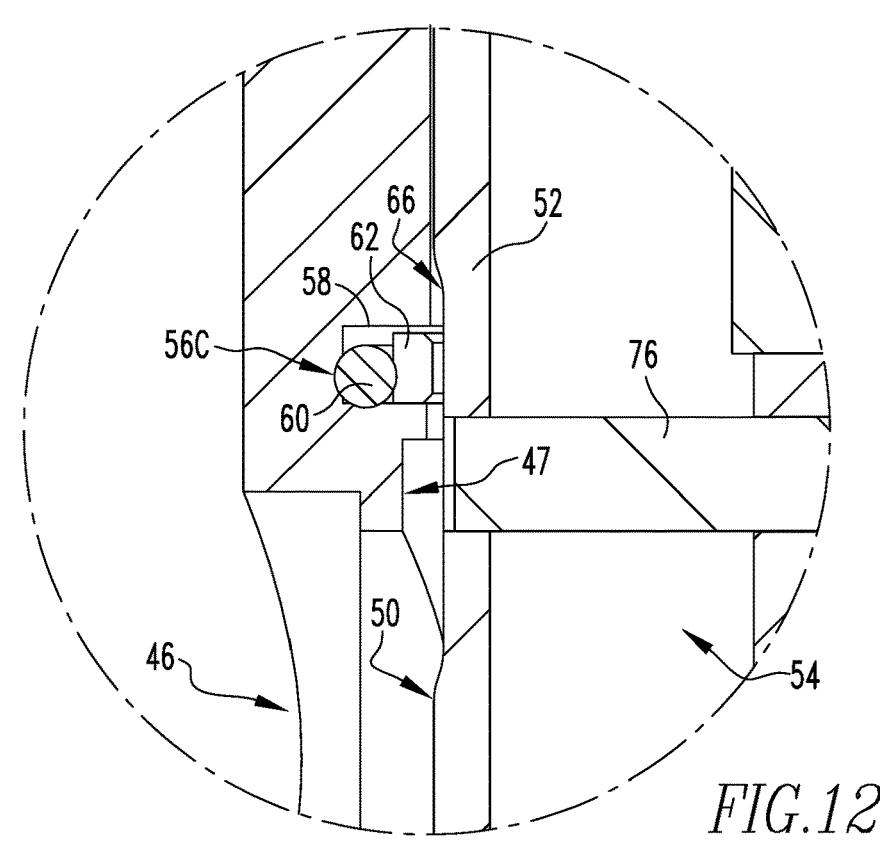

Turning now to FIGS. 2-7, valve assembly 12 includes a valve body 40 defining a cylindrical, main passage 42 therein disposed about a longitudinal axis 43 (FIGS. 5-7). In some example embodiments, valve body 40 is machined from a brass cylinder or brass forging, however, it is to be appreciated that other material or materials may be employed without varying from the scope of the disclosed concept. Valve body 40 includes an inlet port 44 defined in or near a first end 45 of valve body 40. In the example embodiment illustrated, inlet port 44 is defined in first end 45 and extends axially along longitudinal axis 43 between main passage 42 and the exterior of valve body 40. In the example embodiment illustrated in FIGS. 2-7, first end 45 of valve body 40 is formed as a separate end cap which is then coupled (e.g., via a threaded or other suitable arrangement) and sealed (e.g., via an O-ring or other suitable arrangement) to a main cylindrically shaped portion (not numbered) of valve body 40, alternatively, the end cap can be formed as an integral part of the cylindrical body, without being formed as a separate part. Valve body further includes a first outlet port 46 defined in valve body 40 extending radially with respect to longitudinal axis 43 outward from main passage 42, as well as a first annular cavity 47 (FIGS. 5-7, 9 and 12) defined in valve body 40 extending outward from main passage 42. First outlet port 46 and first annular cavity 47 are positioned generally in the same first axial position along longitudinal axis 43 such that first outlet port 46 opens into first annular cavity 47 and first annular cavity 47 axially encompasses first outlet port 46. Similarly, valve body 40 also includes a second outlet port 48 defined in valve body 40 extending radially with respect to longitudinal axis 43 outward from main passage 42, as well as a second annular cavity 49 (FIGS. 5-7, 9 and 11) defined in valve body 40 extending outward from main passage 42. Second outlet port 48 and second annular cavity 49 are positioned generally in the same second axial position along longitudinal axis 43, longitudinally spaced from the aforementioned first axial position, such that second outlet port 48 opens into second annular cavity 49 and second annular cavity 49 axially encompasses second outlet port 48. In the example illustrated embodiment, first and second outlet ports 46 and 48 are clocked generally 180 degrees about longitudinal axis 43, however, it is to be appreciated that first and second outlet ports 46 and 48 may be clocked generally at any other angular relationship without varying from the scope of the disclosed concept. Additionally, in embodiments wherein inlet port 44 is defined near first end 45 of valve body 40 (e.g., extending radially with respect to longitudinal axis 43), inlet port 44 may likewise be clocked generally at any angular relationship with either of first and second outlet ports 46 and 48 without varying from the scope of the disclosed concept. Each of first and second outlet ports 46 and 48 are in fluid communication with inlet port 44 via main passage 42. Each of inlet port 44, and first and second outlet ports 46 and 48 may have fluid conduits (not shown)

coupled thereto (e.g., via any suitable method) or integrally formed with valve body 40 extending generally outward from main passage 42.

As shown in FIGS. 5-8, valve assembly 12 further includes a valve spool 50 positioned within main passage 42 and axially movable along longitudinal axis 43 of valve body 40, as described in detail below. Valve spool 50 includes a cylindrical spool body 52 extending between a first end 52A and an opposite second end 52B. Valve spool 50 is positioned about longitudinal axis 43 and defines a central passage 54 therein that extends between first end 52A and second end 52B and provides for axial gas flow along longitudinal axis 43. In some example embodiments of the disclosed concept, spool body 52 has been formed from brass or stainless steel depending on the wear, friction and pressure requirements, with stainless steel being more durable for the sliding surface. It is to be appreciated, however, that spool body 52 may be formed from other suitable material or materials without varying from the scope of the disclosed concept. Central passage 54 is sized to allow an axial flow path, and to provide sufficient wall thickness to spool body 52 in order to support a drive linkage (described below), and for pressure and mechanical stresses on spool body 52. Each of first and second ends 52A and 52B of spool body 52 are tapered to protect the seal edges during assembly and operation.

In the example embodiment illustrated, valve spool 50, and more particularly spool body 52 thereof, is sealingly engaged with the walls of main passage 42 of valve body 40 via a plurality of seal arrangements 56 (the four seal arrangements 56 shown in FIGS. 5, 6, 7, 9 and 10 include the further designations A-D so as to distinguish each seal arrangement 56 in the accompanying description). As described further below, valve spool slides through seal arrangements 56A-56D in order to close off either one of first or second outlet ports 46 or 48, and thus allow for refrigerant gas to pass to the other of first or second outlet ports 46 or 48, or to allow for refrigerant gas to pass to both of first and second outlet ports 46 and 48 in proportion to the axial position of spool body 52 of valve spool 50. The illustrated example embodiment utilizes four seal arrangements 56A-56D, with each seal arrangement 56 being positioned/fixed in a respective circumferential groove 58 defined in valve body 40 extending around and radially outward from main passage 42. Each seal arrangement 56 may include one or more pieces and may be of any suitable form. In the illustrated example embodiment, each seal arrangement 56 is a two-part design that includes an elastomeric O-ring 60 and a seal ring 62 of semi-rigid composition, such as polytetrafluoroethylene—PTFE, disposed radially inward (with respect to longitudinal axis 43) from O-ring 60. In an example embodiment, seal ring 62 has a rectangular cross section, although other cross-sectional shapes may be employed without varying from the scope of the disclosed concept. In such arrangements, O-ring 60 provides a radially inward force on seal ring 62 which in-turn provides a durable low friction, sliding surface against spool body 52 of valve spool 50.

As shown in FIGS. 5-8, each end 52A and 52B of spool body 52 may include a number of tapered notches 64 (four are included in each end in the illustrated example embodiment) defined therein to provide gradual flow when valve spool 50 is closing or opening either of outlet ports 46 or 48. Notches 64 can be sized to provide the desired, metered flow profile for each outlet port 46 and 48. The notch flow enhances the response of the valve when opening or closing an adjacent outlet port of first and second outlet ports 46 and 48. As perhaps best shown in FIG. 8, spool body 52 may include a number of recesses 66 defined therein extending inward from an outer circumferential surface 68 thereof. Each recess 66 is defined (e.g., via milling or other suitable process) at a certain axial position, depth, and length so as to align with one of seal arrangements 56B or 56C when a respective one of second and first outlet ports 48, 46 are closed, such as described in detail below. As discussed below, the purpose of each recess 66 is to allow refrigerant to vent from between middle seal arrangements 56B and 56C, and thus prevent entrapment of refrigerant between seal arrangements 56B and 56C. Liquid refrigerant, if present, can cause damage by thermal expansion. Additionally, the seal arrangement 56B or 56C that is vented by each recess 66 will not have pressure loads, which will reduce the force required to move valve spool 50 axially. In embodiments wherein the number of recesses 66 are not present, middle seal arrangements 56B and 56C are redundant.

Valve spool 50 can be actuated along longitudinal axis 43 via any suitable linear drive 70 coupled to valve spool via any suitable arrangement(s) that provide(s) linear motion to valve spool 50 from zero, variable, and to 100% positions such as described below. Linear drive 70 can include, for example, without limitation, a multi-step motor, servo motor, mechanical gear and linkages, pneumatic, refrigerant pressure, magnetic, piezoelectric drives, or any other suitable arrangement controllable via controller 26. Control means of such actuator arrangements are various and commonly known in the industry. Feedback devices, such as encoders, proximity, and LVDT sensors, can be applied per the selected actuator. In addition to automated means, valve spool 50 may be actuated by manual input and by manual override arrangements. Valve spool 50 is constructed such that it can function normally if rotating motion thereof is encountered. In the example shown in the sectional views of FIGS. 5-7, linear drive 70 is a stepper motor 72 (shown schematically) in electrical communication with controller 26 and mechanically coupled (e.g., directly or indirectly via a threaded or other suitable arrangement) to a second end 74 of valve body 40 opposite first end 45. In such arrangement, valve spool 50 further includes a dowel pin 76 that spans across central passage 54 of spool body 52 and is engaged at each end (e.g., via apertures 78 defined in spool body 52) thereof with spool body 52. Dowel pin 74 is coupled to an actuatable head portion 80 of stepper motor 72 to provide for actuation of valve spool 50 by stepper motor 72. Although shown coupled via dowel pin 74, it is to be appreciated that stepper motor 72 may be coupled directly or via any suitable intermediate arrangement to valve spool 50 without varying from the scope of the disclosed concept. In the illustrated example embodiment shown in FIGS. 5-7, stepper motor 72 is effectively coupled and sealed to valve body 40 via an end cap 82 engaged with second end 74 of valve body 40.

In use, the entire cavity of valve body 40 (except adjacent to a blocked outlet port) and internal parts are exposed to high pressure and temperature. Linear drive 70/stepper motor 72 and end cap 82 are also filled with high pressure. The outlet port and adjacent outer areas of spool body 52 can achieve a lower pressure, depending on modulated flow pressure drop or full isolation. Linear drive/stepper motor 72 can be obtained with various step increments per revolution, with or without a gear reduction, acme screw output shaft and plunger, and stroke length. The intermediate positions of valve spool 50 are divided into small increments, as determined by the design of stepper motor 72. Stepper motor 72 is electrically pulsed to move valve spool 50 in either axial direction along longitudinal axis 43. When stepper motor 72 is not pulsed, the valve spool 50 stays in the last position.

Figure 2:
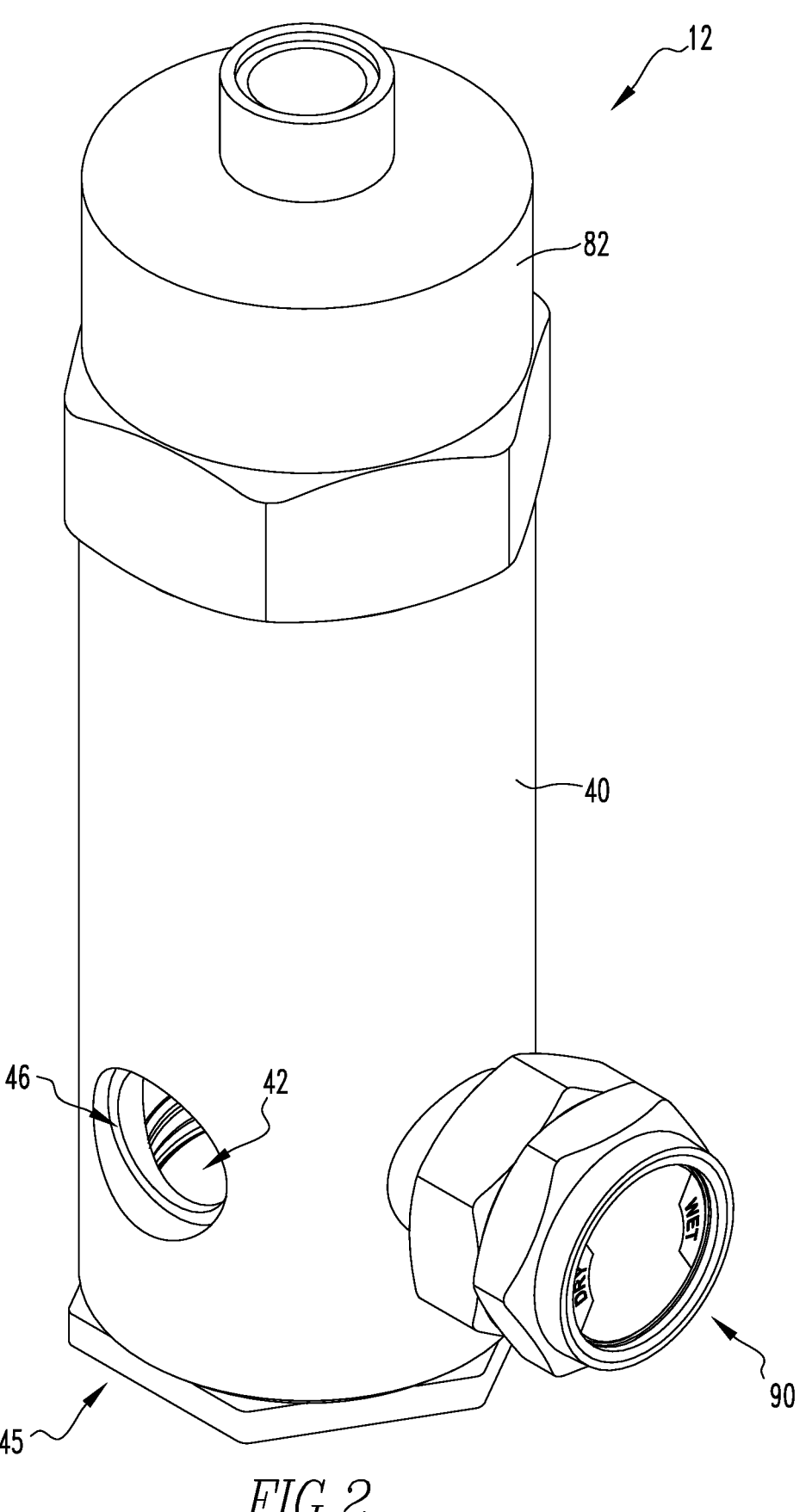
FIG. 2 is a perspective view of a valve assembly in accordance with one example embodiment of the disclosed concept showing a top portion of the valve assembly and a first outlet port defined in a side of the valve assembly.

Valve assembly 12 may further include an optional sight glass/moisture indicator 90 located in an axial position between the two seal arrangements 64C and 64D on either side of first outlet port 46 (such as shown in FIGS. 2-4) or between the two seal arrangements 64A and 64B on either side of second outlet port 48. This allows the side hole (not numbered) for the sight glass to be part of the cavity, and not interfering with flow or sealing. The position of valve spool 50 can be viewed through sight glass/moisture indicator 90.

From the further description/discussion below, it is to be appreciated that although inlet port 44 has been shown/described in the example embodiment illustrated herein as being disposed in (i.e., extending axially as illustrated) or near (i.e., extending radially similar to first outlet port 46) first end 45 of valve body 40, it is to be appreciated that alternatively inlet port 44 may be positioned radially near second end 74 of valve body (e.g., between second end 74 and second outlet port 48) without varying from the scope of the disclosed concept.

Having thus described the components of the example valve assembly 12 in accordance with an example embodiment of the disclosed concept, operation of valve assembly 12 as a 3-way modulating valve within system 10 of FIG. 1 will now be generally described. As generally previously described, gas in system 10 takes two paths within valve body 40, depending on the position of valve spool 50, which is controlled by controller 26. When valve spool 50 is in a top, first position (which may be considered as the zero position of valve spool 50), such as shown in FIG. 5, second outlet port 48 is shut off from main passage 42 (and thus inlet port 44) by seal arrangement 56A and seal arrangement 56C. In such first position, seal arrangement 56B is vented to second outlet port 48 via recess 66 of spool body 52 due to the position of seal arrangement 56B radially over recess 66, such as shown in the detail view of such portion of FIG. 5 shown in FIG. 11. In such first position, first end 52A of spool body 52 extends through seal arrangement 56A. As second outlet port 48 is blocked, the downstream path connected to second outlet 48 is thus inactive. That particular path may be reduced in pressure by venting to a lower system pressure, as provided by the system. Second outlet 48 pressure is established between seal arrangements 56A and 56C, including second annular cavity 49. High pressure remains in central passage 54 of valve spool 50, without flow. Second end 52B of spool body 52 is spaced above seal arrangement 56D, thus allowing all gas entering inlet port 44 to flow through first outlet port 46. The pressure drop through valve assembly 12 to first outlet port 46 is minimal.

As valve spool 50 moves down (i.e., toward inlet port 44) to allow refrigerant gas to start flowing to second outlet port 48, hot gas begins flowing to heat reclaim coil 18. In moving downward from the previously described first position, first end 52A of spool body 52 moves down through seal arrangement 56A. A small percentage of the stroke is required to fully extract spool body 52 from seal arrangement 56A. The number of notches 64 in first end 52A of spool body 52 (FIG. 8), if present, allow a small initial flow into second outlet port 48, prior to full extraction of spool body 52 from seal arrangement 56A. The number and size of notches 64 can be modified to allow more or less flow at the initial positions of spool body 52. The number of notches 64 provide a flow path with a shorter initial stroke. The number of notches 64 work in conjunction with the smooth taper on first end 52A of spool body 52, while seal arrangement 56A is contracting as valve spool 50 moves away. The gradual flow to second outlet port 48 assists controller 26 in metering the correct flow. As additional flow is needed in second outlet port 48, the control will pulse motor 72 to move valve spool 50 further down. While first end 52A of spool body 52 is near seal arrangement 56A, there will be more pressure drop between inlet port 44 and second outlet port 48 than that to first outlet port 46. As valve spool 50 moves down, second outlet port 48 will receive more flow, while the flow to first outlet port 46 decreases. This is intrinsic to the ability of valve assembly 12 to modulate the flow in proportion to the unit control. As valve spool 50 reaches mid-stroke, such as shown in FIG. 7, the pressure drop is similar to either of first or second outlet ports 46 or 48. The control will tend to modulate valve spool 50 in either direction incrementally, as needed by controller 26. While first and second ends 52A and 52B of spool body 52 are not touching either seal arrangement 56A or 56D, seal arrangements 56B and 56C provide radial support, keeping spool body 52, and thus valve spool 50, centered in main passage 42 and clear from contacting valve body 40.

As more flow is needed to second outlet port 48 and less to first outlet port 46, spool valve 50 moves downward toward a bottom, second position (which may be considered as the 100% position of valve spool 50), such as shown in FIG. 6. As second end 52B of spool body 52 gets closer to seal arrangement 56D, pressure drop from inlet port 44 to first outlet port 46 increases. The tapered end of spool body 52 helps to align seal arrangement 56D, while the number of notches 64 in second end 52B of spool body 52 (FIG. 8), if present, allows some flow, thus gradually shutting off first outlet port 46. Spool body 52 will extend partially past seal arrangement 56D to achieve complete shut off. While the path connected to first outlet port 46 is inactive, the downstream pressure will establish between seal arrangement 56B and seal arrangement 56D. In such positioning, seal arrangement 56C is vented to first outlet port 46 due to the position of seal arrangement 56C radially over recess 66 of spool body 52, such as shown in the detail view of such portion of FIG. 6 shown in FIG. 12. In such second position, all flow through valve assembly 12 will be to second outlet port 48 through central passage 54 of valve spool 50 at minimal pressure drop.

From the foregoing it is to be appreciated that the two middle seal arrangements 56B and 56C are always in contact with spool body 52, which keeps valve spool 50 centered and axially aligned in valve body 40. Only one end seal arrangement 56A or 56D at a time will be in contact when valve spool 50 is in the closed port position or nearly open or closed. When not in contact, the end seal arrangements 56A, 56D tend to contract radially, due to the elasticity of the O-ring 60 thereof, and remain in place in the respective body groove 58. The end seal ring 62, which is not in contact or partially in contact with the spool body 52, is protected from damage or distortion, due to having high pressure always exerted on the inside circumferential surface thereof. When spool body 52 is contacting a seal ring 62, the overall radial spacing between the outer diameter of spool body 42 and the depth of body groove 58, causes compression of O-ring 60, thus providing a radial contact force on seal ring 62 and spool body 52. This contact force and the coefficient of friction of the seal material translate to the required force load on motor/drive 70. Sealing relies on the radial force at the seal ring 62 on the surface of spool body 52. Most of the valve operation during modulation is in the intermediate positions with the middle seal arrangements 56B and 56C, and has minimal load on motor/drive 70. When spool body 52 engages one of the end positions, there will be sliding friction in three seal arrangements (i.e., middle seal arrangements 56B and 56C and either of 56A or 56D). If there is a pressure differential while one of outlet ports 46 or 48 is inactive such as previously described, the O-rings 60 of the two active seal arrangements will tend to compress in the axial direction. O-ring 60 will conform to the sealing surfaces and exert more radial force on seal ring 62. This in turn applies more force on spool body 52, and more axial force will be required to overcome friction to move valve spool 50 out of the end seal arrangement 56A or 56D. Thus, the highest motor load is during the initial stroke under pressure differential. Once clear of the end seal arrangement 56A or 56D, pressure differential and frictional resistance decreases. As previously discussed, it is to be appreciated that other types of seals can be used, such as spring activated rod seals. The two middle seal locations would facilitate the proper orientation of spring or lip seals, since such seals have a preferred direction.

It is to be appreciated that in such arrangement of valve spool 50 within valve body 40 such as described herein, the pressure forces are balanced in a simple manner by having high pressure exposed on both ends of valve spool 50. The radial pressure forces are balanced by having the pressure differences between the outside and inside surfaces of spool body 52 being distributed 360° around the circumference of spool body 52. This geometry provides generous flow area, which achieves higher flow rates, compared to disk and seat mechanisms of conventional designs. This geometry also achieves pressure force balance on valve spool 50 in the axial direction which prevents excess force loads on the motor/drive, due to net pressure forces or from excessive seal friction. Motor loads due to pressure imbalances are minimal, only due to slight flow effects.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A valve assembly comprising:
a valve body defining a cylindrical passage therein disposed about a longitudinal axis of the valve body;
an inlet port defined in the valve body;
a plurality of outlet ports defined in the valve body; and
a cylindrical valve spool positioned within, and sealingly engaged with, the cylindrical passage, the valve spool defining a central passage therethrough,
wherein the valve spool is moveable along the longitudinal axis among:
a first position wherein the inlet port is in fluid communication with a first outlet port of the plurality of outlet ports but not a second outlet port of the plurality of outlet ports,
a second position wherein the inlet port is in fluid communication with the second outlet port but not the first outlet port, and
an intermediate position between the first position and the second position wherein the inlet port is in fluid communication with both of the first outlet port and the second outlet port, and
wherein:
as the valve spool moves into the first position, the valve spool slidingly circumferentially engages a circumferential seal arrangement forming a seal between the valve spool and the valve body; and as the valve spool moves out of the first position, the valve spool slidingly circumferentially disengages the circumferential seal arrangement.

2. The valve assembly of claim 1, wherein:
as the valve spool moves into the second position the valve spool slidingly circumferentially engages a second circumferential seal arrangement forming a seal between the valve spool and the valve body; and
as the valve spool moves out of the second position the valve spool slidingly circumferentially disengages the second circumferential seal arrangement.

3. The valve assembly of claim 1, wherein the inlet port is defined in or near a first end of the valve body.

4. The valve assembly of claim 1, wherein each outlet port extends radially with respect to the longitudinal axis outward from the cylindrical passage.

5. The valve assembly of claim 1, further comprising a linear drive coupled to the valve spool, wherein the linear drive is structured to selectively position the valve spool among the first position, the second position, and the intermediate position.

6. The valve assembly of claim 5, wherein valve spool comprises a dowel pin extending across the central passage, and wherein the linear drive is coupled to the valve spool via the dowel pin.

7. The valve assembly of claim 1, wherein the valve body comprises an end cap selectively coupled to the remainder of the valve body and wherein the inlet port is defined in the end cap.

8. The valve assembly of claim 7, wherein the end cap is selectively coupled to the remainder of the valve body via a threaded connection.

9. The valve assembly of claim 7, further comprising a sight glass selectively coupled to a port formed in the valve body.

10. A valve assembly comprising:
a valve body defining a cylindrical passage therein disposed about a longitudinal axis of the valve body;
an inlet port defined in the valve body;
a plurality of outlet ports defined in the valve body; and
a cylindrical valve spool positioned within, and sealingly engaged with, the cylindrical passage, the valve spool defining a central passage therethrough,
wherein the valve spool is moveable along the longitudinal axis among:
a first position wherein the inlet port is in fluid communication with a first outlet port of the plurality of outlet ports but not a second outlet port of the plurality of outlet ports,
a second position wherein the inlet port is in fluid communication with the second outlet port but not the first outlet port, and
an intermediate position between the first position and the second position wherein the inlet port is in fluid communication with both of the first outlet port and the second outlet port, and
wherein the valve spool includes a first end and a second end disposed opposite the first end, and wherein at least one of the first end and/or the second end includes a number of tapered notches defined therein.

11. The valve assembly of claim 10, wherein the number of notches comprises a plurality of notches.

12. The valve assembly of claim 10, wherein each of the first end and the second end includes a number of tapered notches defined therein.

13. The valve assembly of claim 12, wherein the number of notches comprises a plurality of notches.

14. A refrigeration system including a valve assembly comprising:

a valve body defining a cylindrical passage therein disposed about a longitudinal axis of the valve body;

an inlet port defined in the valve body;

a plurality of outlet ports defined in the valve body; and a cylindrical valve spool positioned within, and sealingly engaged with, the cylindrical passage, the valve spool defining a central passage therethrough, wherein the valve spool is moveable along the longitudinal axis among:

a first position wherein the inlet port is in fluid communication with a first outlet port of the plurality of outlet ports but not a second outlet port of the plurality of outlet ports, a second position wherein the inlet port is in fluid communication with the second outlet port but not the first outlet port, and an intermediate position between the first position and the second position wherein the inlet port is in fluid communication with both of the first outlet port and the second outlet port, and wherein:

as the valve spool moves into the first position the valve spool slidingly circumferentially engages a circumferential seal arrangement forming a seal between the valve spool and the valve body; and as the valve spool moves out of the first position the valve spool slidingly circumferentially disengages the circumferential seal arrangement.

15. The refrigeration system of claim 14, wherein:

as the valve spool moves into the second position the valve spool slidingly engages a second circumferential seal arrangement forming a seal between the valve spool and the valve body; and as the valve spool moves out of the second position the valve spool slidingly disengages the second circumferential seal arrangement.

16. The refrigeration system of claim 14, wherein the valve spool includes a first end and a second end disposed opposite the first end, and wherein at least one of the first end and/or the second end includes a number of tapered notches defined therein.

17. The refrigeration system of claim 16, wherein each of the first end and the second end includes a number of tapered notches defined therein.

* * * * *